April 12, 1938.   N. A. MONFILS   2,113,706
GAUGE FOR CUTTING MACHINES
Filed Dec. 29, 1936   2 Sheets-Sheet 2
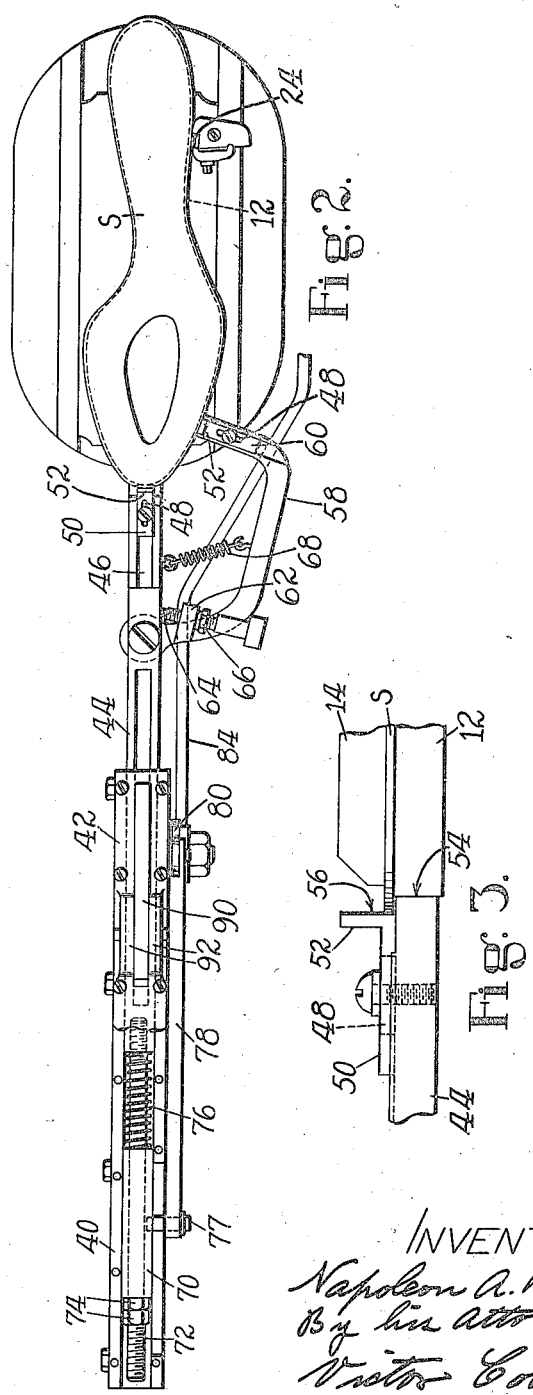

Patented Apr. 12, 1938

2,113,706

UNITED STATES PATENT OFFICE 2,113,706

GAUGE FOR CUTTING MACHINES

Napoléon A. Monfils, Haverhill, Mass., assignor to United Shoe Machinery Corporation, Paterson, N. J., a corporation of New Jersey Application December 29, 1936, Serial No. 118,139

19 Claims. (Cl. 12—25)

My invention relates to means for locating material in a machine by which it is to be cut, as one for severing from the material sole-pieces or for outlining or incising the contour of the soles in the material.

In certain sole-cutting or rounding operations, it is difficult to position the material with reasonable accuracy upon the pattern in accordance with which it is to be formed. This is true of some insoles which are thin and flaccid, and in which the excess of width of the margin over the cut piece is small. The object of this invention is to provide for the ready and accurate location of this and other work without interference with the operation of the machine and without inconveniencing or imposing a burden upon the operator.

To this end, I combine with a pattern of a cutting or rounding machine, upon which pattern the work to be operated upon is supported, a gauge automatically moved to normal active relation to the pattern at the completion of an operating cycle of the machine ready to position the work, together with means arranged to move said gauge to an inactive position prior to the starting of the machine. By this arrangement, the gauge is ready for the performance of its function without effort on the part of the operator. Separation of the gauge from the pattern upon operation of the machine is preferably by connection to a member, such as an operator-controlled lever, by the actuation of which the machine is started. Withdrawal of the gauge is thus made dependent upon an act which the operator must perform in his customary control of the machine, it being effected without thought as to the gauge-movement and without appreciable effort. The gauge may be returned to its active relation by means acting upon the operator-controlled member, for example, by a spring-actuated rod which is connected to the lever. In the particular embodiment of the invention herein disclosed, the gauge is furnished by a slide movable upon a bracket projecting from the frame of the machine. An intermediate lever is fulcrumed upon the frame, and this intermediate lever is connected to the starting lever of the machine and to the slide. The gauge mechanism is thereby made a part of the machine, yet may be so arranged that it in no way interferes with the operator. There may be occasions when the operator may wish the gauge to be separated from the pattern while the machine is at rest, as when, for the production of a different size of sole, the pattern is to be changed. That this may be accomplished, while the connection between the gauge and its controlling means is maintained, I provide a movable actuating member, which may be in the form of a slide, for the gauge and interpose between them yieldable means by which the movement of the actuating member is communicated to the gauge. This permits the gauge to be forced back from its active position, while the actuating means and the connections to the controlling means or starting lever remain undisturbed. The connection also allows the gauge to yield upon engagement with the pattern, so its setting need not be exact. With the gauge a lock is combined, so said gauge may be held temporarily in its withdrawn position. The illustrated organization has a guide member upon which the gauge-slide and the actuating slide are movable, an interposed spring transmitting the movement of the actuating slide to the gauge-slide. A locking lever pivoted upon the guide member and acting upon the gauge-slide holds the latter in the position to which the operator carries it. The gauge-slide is shown as having an end-portion for contact with an end of the pattern, there being also an arm pivoted upon the slide and having an end-portion for contact with the side of the pattern. Both these end-portions preferably have gauge members variable in position thereon and arranged to receive contact of the sole-material. The arm may be connected to the slide by a spring which draws a variable stop upon one of these elements against the other. Thereby, it may be adjusted to approximately the proper relation to the particular pattern which is to be employed and yield upon engagement with the pattern to give the final gauging position.

In the accompanying drawings,

Fig. 2 is an enlarged top-plan view of the gauge, together with a pattern and its support, and Fig. 3, a detail in side elevation of the end-portion of the gauge-slide, particularly illustrating its relation to the pattern and the work thereon.

Figure 1:
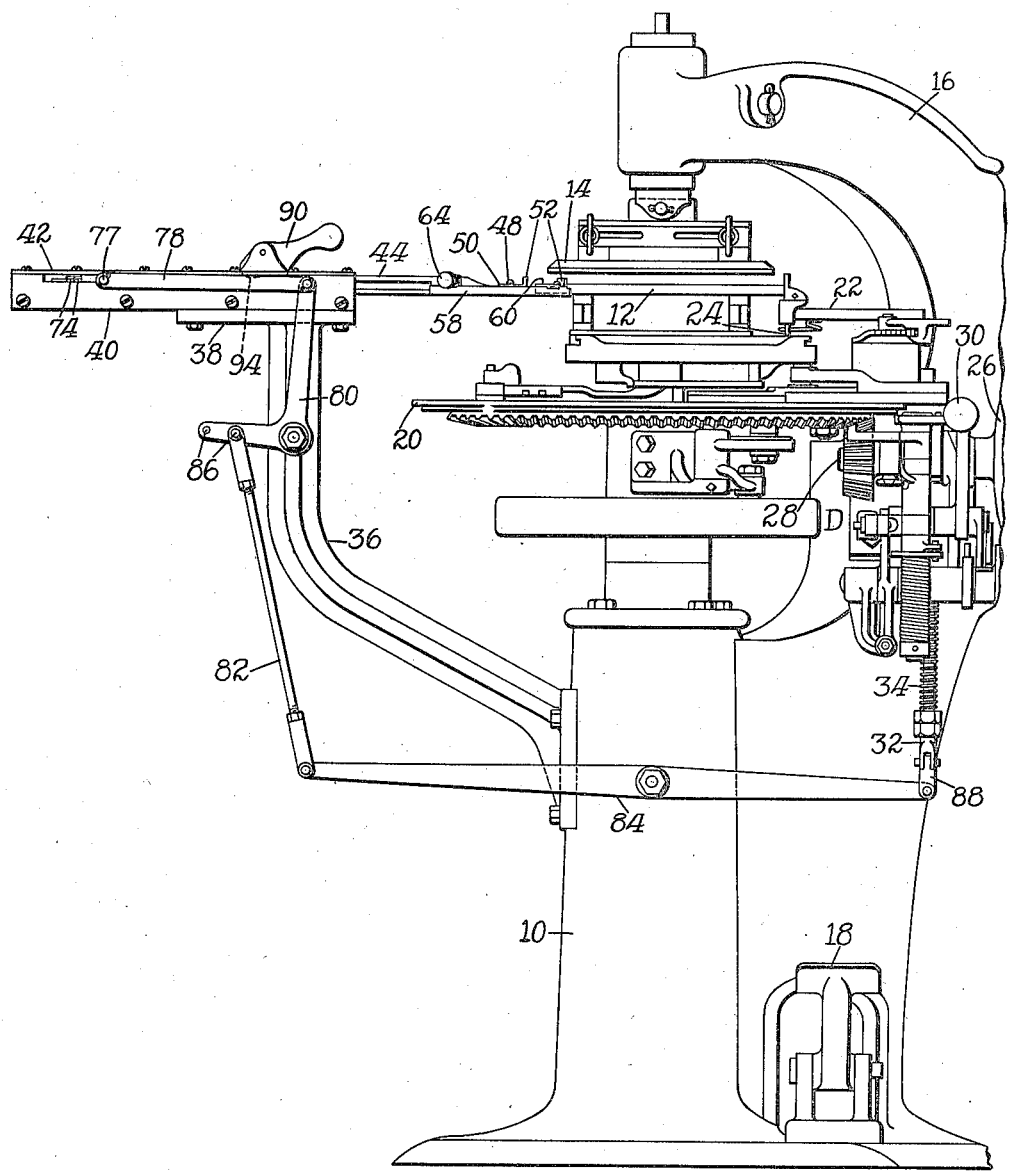
Fig. 1 is a partial side elevation of a sole-rounding machine provided with the gauge of the present invention.

The rounding machine shown in the drawings is of the well-known Planet type. A frame-standard 10 fixedly but interchangeably supports a horizontal pattern 12, the periphery of which has the contour of the sole to be cut. Upon the pattern, the sole-material is held for the operation by a clamp 14 movable vertically upon an overhanging frame-arm 16 through a connection to a treadle 18. A rotary table 20 carries a pivoted arm 22 and knife 24, the latter severing the material under the guidance of the pattern. The driving mechanism D of the table may be as disclosed in Letters Patent of the United States No. 1,048,511, Eaton, December 31, 1912. Through clutch mechanism, a fragment of which appears at 26 in Fig. 1 of the drawings in this case, power may be applied to a shaft 28 to rotate the table. Driving engagement of the clutch is produced through the depression by the operator of a starting lever 30, which is then latched in this position, to be released by a cam-projection upon the table to terminate the operating cycle. This latch and cam of the Eaton apparatus do not appear in my drawings. The lever 30 is returned to its normal, raised position by a rod 32 drawn down by a spring 34 surrounding it.

Projecting from the standard 10 at the outer side below the end of the pattern 12 is a bracket 36, first inclined upwardly and then extending substantially vertically to a point somewhat below the level of the pattern. At that point, designated by the numeral 38, it is enlarged to support a horizontally extended casing 40 furnishing a guideway partially closed at the top by a cover-plate 42. Movable in the guideway is a carrier or gauge-slide 44. At the inner end of this slide, in its upper face, are ways furnished by a slot 46, and in this slot is variably secured by a slot-and-screw connection 48 a gauge-plate 50 having a vertical end-portion 52. The end-surface 54 of the slide 44 is horizontally alined with the periphery of the pattern 12, while the vertical face 56 of the plate 50 upon the slide lies opposite the material on the pattern. Upon the slide 44, at the side toward the operator, is pivoted a gauge-arm 58 having at its end a surface for engagement with the pattern and carrying an adjustable plate 60, the arrangement here being similar to that at the end of the slide. Through a lug 62 rising from the arm 58 a screw 64 is threaded, retained in the position to which it may be adjusted by a lock-nut 66. The point of this screw is drawn normally against the side of the slide by a tension-spring 68 joining the arm to the slide. This permits an approximate adjustment of the gauge-surfaces upon the arm to the particular pattern to be used, the exact relation being established by the contact of the surface 54 with the edge of the pattern, the spring yielding.

In the outer portion of the guideway of the casing 40, a slide 70 is arranged to reciprocate to actuate the gauge-slide 44. Movement of the actuating slide is yieldably communicated to the gauge-slide. From the outer end of the latter projects a shank 72 passing through an opening in the former and being threaded at its outer end to receive a nut and lock-nut 74. Surrounding the shank between the slides is a compression-spring 76 which separates said slides to an extent allowed by the contact of the inner nut 74 with the slide 70. From one side of this slide 70 through a longitudinal slot in the casing projects a stud 77 joined by a link 78 to a bell-crank-lever 80 fulcrumed upon the bracket 36. A link 82 unites the lever 80 to an intermediate lever 84 fulcrumed upon the standard 10. I have shown connections for the link 82 at different points 86 to the lever 80, and the link variable in length, so by these adjustments the oscillation of the lever 84 may cause the travel of the slide 70 through different distances. The end of the lever 84 opposite the link 82 is joined by a link 88 to the spring-actuated rod 32 which elevates to its normal position the starting lever 30 of the driving mechanism D.

Let it be assumed that the work to be operated upon consists of insoles which have been split from previously rounded outsoles and therefore have only a slight marginal excess of area which it is desired to remove to provide insoles of the proper size. The gauge-plates 50 and 60 will be adjusted by their connections 48, so that when the gauge-surfaces 54 are in contact with the periphery of the pattern 12 at the toe-end and side of the forepart, respectively, the surfaces 56 will serve to correctly determine the position of an insole upon the pattern. The knife 24, which initially rests at the side of the heel-end of the pattern toward the operator, furnishes a third gauging point. Normally, the starting lever 30 is raised and its rod 32 is depressed by the spring 34. This holds the actuating slide 70 and, through the spring 76, the gauge-slide 44 and its arm 58 forward in active positions determined approximately by adjustment of the link 82, the nuts 74 and the screw 64, the springs 76 and 68 yielding upon contact of the gauge-surfaces 54 with the pattern to compensate for any excess of movement. The operator places an insole s upon the pattern in contact with the surfaces 56 of the plates 50 and 60 and in the proper relation to the knife 24, the location of the gauge mechanism being such that it in no way interferes with the manipulation. The treadle 18 is then lowered, and the clamp 14 descends to hold the work upon the pattern. Finally, the lever 30 is depressed to initiate the power-cycle of the machine and is latched down until said cycle terminates. As the rod 32 rises, the spring 34 being compressed, the lever 84 is turned anticlockwise, as viewed from the operator's side of the machine. Through the chain of connecting elements, the slide 70 is caused to move outwardly, the nut 74 and shank 72 carrying the slide 44 and the gauges with it. Before the clutch included in the mechanism D is engaged, as a result of the movement of the starting lever, the gauges are fully withdrawn, leaving a space about the table 20 clear for the operation of the knife mechanism as it travels about the pattern. Upon the completion of the machine-cycle and the cutting of the insole, the lever 30 is automatically unlatched, and is restored to normal by the spring 34. Since the starting mechanism includes a brake which controls the descent of the rod 32, the restoration of the gauging means through the chain of connections to the rod to the normal, active position occurs without material shock. Upon release of the treadle and removal of the rounded insole, the machine is ready for the succeeding operation.

While the machine is not operating, and the gauge-slide 44 is therefore forward, the operator may wish said slide in the inactive position; for example, to permit the ready changing of one size of pattern for another. The actuating slide 70 is held against movement by the connections to the starting mechanism, but the operator may force the gauge-slide back to the desired extent, compressing the spring 76. The gauge elements may be retained by the operator as thus withdrawn by manipulation of a locking lever 90 fulcrumed upon the top of the casing 40 between lugs 92, 92. A cam-surface 94 upon the under side of the lever is arranged to engage the upper surface of the slide 44 and resist its forward movement. The same engagement holds the lever in the locking relation until its upper extremity has been depressed by the operator.

Having described my invention, what I claim as new and desire to secure by Letters Patent of the United States is:

1. In a cutting machine, a pattern, a work-gauge movable into and out of contact with the pattern, means for automatically moving the gauge to normal active relation to the pattern at the completion of an operating cycle of the machine, and means arranged to move the gauge to an inactive position prior to the starting of the machine.

2. In a cutting machine, a pattern, a work-gauge movable into and out of contact with the pattern, means for holding the gauge normally in engagement with the pattern, and means arranged for manipulation by the operator to control the operation of the machine, said means including a connection to the gauge to move it out of engagement with the pattern.

3. In a cutting machine, a pattern, a work-gauge movable into and out of co-operation with the pattern, means for holding the gauge normally in active relation to the pattern, a member movable to start the operation of the machine, a spring by which the member is urged to its normal position, and connections to the member for communicating the action of the spring to the gauge.

4. In a cutting machine, a pattern, a work-gauge movable into and out of co-operation with the pattern, means for holding the gauge normally in active relation to the pattern, a member movable to start the operation of the machine, connections to the member for moving the gauge to an inactive position, and means acting upon the member to return the gauge to its active position.

5. In a rounding machine, a pattern, cutting mechanism movable about the periphery of the pattern, a lever by which the peripheral travel of the cutting mechanism is initiated, a work-gauge movable into and out of co-operation with the pattern, and connections to the lever for moving the gauge.

6. In a rounding machine, a pattern, cutting mechanism movable in co-operation with the pattern, a starting lever for the machine, a spring-actuated rod acting upon the lever, a gauge movable into and out of co-operation with the pattern, and connections between the gauge and rod for moving said gauge in opposite directions.

7. In a rounding machine, a frame, a pattern mounted thereon, cutting mechanism movable in co-operation with the pattern, an operator-controlled starting lever for the cutting mechanism, a bracket projecting from the frame outwardly and upwardly to the plane of the pattern, a slide movable upon the bracket into and out of contact with the pattern, an intermediate lever fulcrumed upon the frame, connections from the intermediate lever to the starting lever, and connections from the intermediate lever to the slide.

8. In a rounding machine, a frame, a pattern mounted thereon, cutting mechanism movable in co-operation with the pattern, an operator-controlled starting lever for the cutting mechanism, a spring-actuated rod by which the starting lever is held in normal position, a bracket projecting from the frame, a slide movable upon the bracket into and out of cooperation with the pattern, an intermediate lever fulcrumed upon the frame and linked to the rod, and a bell-crank-lever fulcrumed upon the bracket and linked to the intermediate lever and to the slide.

9. In a cutting machine, a pattern, a gauge member movable into and out of contact therewith and arranged for engagement by the periphery of work when applied to the pattern, a movable actuating member for the gauge member, and yieldable means for communicating the movement of the actuating member to the gauge member.

10. In a cutting machine, a pattern, a movable gauge member co-operating therewith, a movable actuating member for the gauge member, yieldable means for communicating the movement of the actuating member to the gauge member, and means for locking the gauge member against movement.

11. In a rounding machine, a pattern, a guide member associated with the pattern, a carrier movable upon the guide member, a gauge mounted upon the carrier for co-operation with the pattern, an actuating member movable upon the guide member, and means for yieldably communicating the movement of the actuating member to the carrier.

12. In a rounding machine, a pattern, a guide member associated with the pattern, a carrier movable upon the guide member, a gauge mounted upon the carrier for co-operation with the pattern, an actuating member movable upon the guide member, means for yieldably communicating the movement of the actuating member to the carrier, a member movable to control the machine, and means for moving the actuating member from the controlling member.

13. In a rounding machine, a pattern, a guide member associated with the pattern, a carrier movable upon the guide member, a gauge mounted upon the carrier for co-operation with the pattern, an actuating member movable upon the guide member, means for yieldably communicating the movement of the actuating member to the carrier, and means arranged to lock the carrier upon the guide member.

14. In a rounding machine, a pattern, a guide member associated with the pattern, a gauge-slide movable upon the guide member, an actuating slide movable upon the guide member, and a spring interposed between the slides.

15. In a rounding machine, a pattern, a guide member associated with the pattern, a gauge-slide movable upon the guide member and having a projection, an actuating slide movable upon the guide member and being provided with an opening through which the projection extends, and a spring surrounding the projection between the slides.

16. In a rounding machine, a pattern, a guide member associated with the pattern, a gauge-slide movable upon the guide member, an actuating slide movable upon the guide member, a spring interposed between the slides, and a locking member pivoted upon the guide member for engagement with the gauge-slide.

17. In a sole-rounding machine, a pattern, a slide having an end-portion for contact with an end of the pattern, a gauge-arm pivoted upon the slide and having an end-portion for contact with the side of the pattern, and gauge members variable in position upon the end-portions of the slide and arm and arranged to receive contact of sole-material.

18. In a sole-rounding machine, a pattern, a slide having an end-portion for contact with an end of the pattern, a gauge-arm pivoted upon the slide and having an end-portion for contact with the side of the pattern, a spring connecting the slide and arm, and a stop member variable in position upon one of these elements and arranged to engage the other.

19. In a sole-rounding machine, a pattern, a slide having an end-portion for contact with an end of the pattern, a gauge-arm pivoted upon the slide and having an end-portion for contact with the side of the pattern, a spring connecting the slide and arm, a stop member variable in position upon one of these elements and arranged to engage the other, and a gauge-plate variable in position upon each of said elements and arranged to receive contact of the sole-material.

NAPOLÉON A. MONFILS.